Jan. 2, 1968  G. C. HOWARD  3,361,201
METHOD FOR RECOVERY OF PETROLEUM BY FLUID INJECTION
Filed Sept. 2, 1965
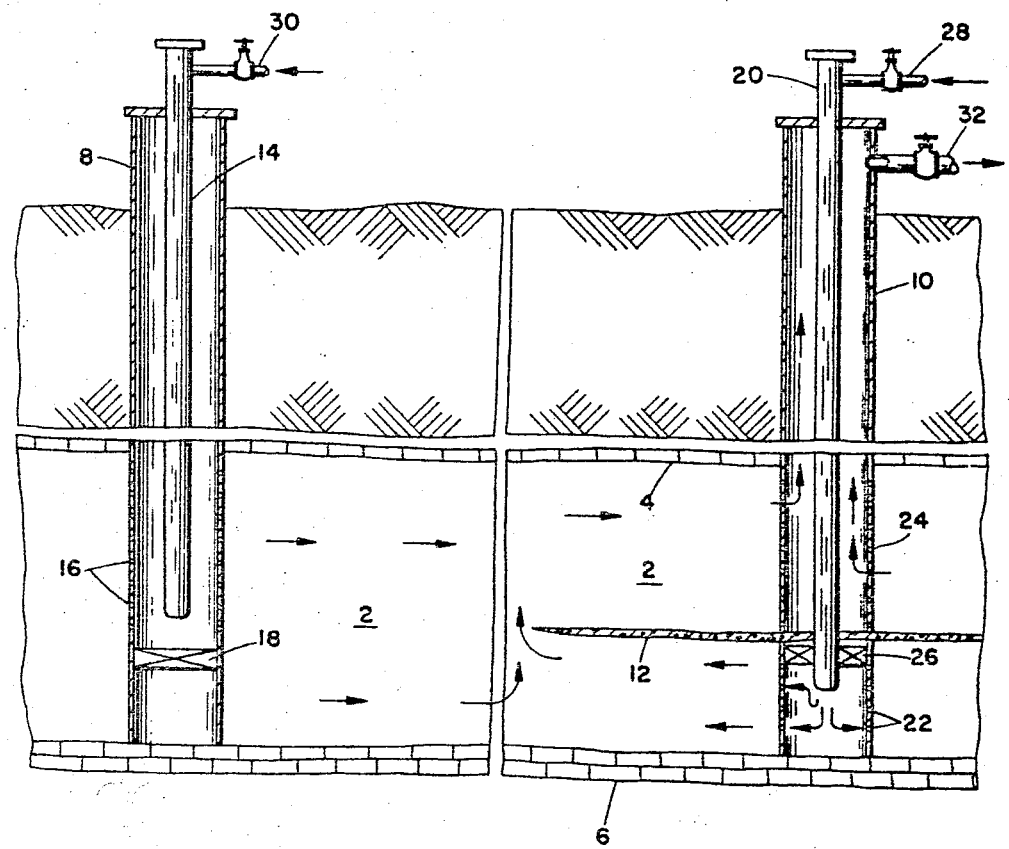
GEORGE C. HOWARD
*INVENTOR.*
BY
*ATTORNEY.*

United States Patent Office 3,361,201
Patented Jan. 2, 1968

3,361,201
METHOD FOR RECOVERY OF PETROLEUM BY FLUID INJECTION
George C. Howard, Tulsa, Okla., assignor to Pan American Petroleum Corporation, Tulsa, Okla., a corporation of Delaware
Filed Sept. 2, 1965, Ser. No. 484,520
12 Claims. (Cl. 166—9)

ABSTRACT OF THE DISCLOSURE

This process contemplates creation of a fracture in the oil bearing zone penetrated by a producing wall, thereafter the fracture may be filled with cement to create a relatively thin pancake impermeable to fluids. An oil soluble fluid is then introduced into the oil zone under conditions, for example, such that said fluid flows only below the pancake. This fluid or solvent travels out into the formation to the far end of the barrier and mixes with the oil causing the latter to become less viscous. Simultaneously a fluid is introduced into the oil bearing zone via an off-set well causing oil to flow toward the producing well. With the reduction in viscosity of oil around the producing well movement of oil into the producing well is more readily effected.

---

The present invention relates to the recovery of petroleum, typically that having an API gravity of 25° or less from reservoirs thereof. More particularly, it is concerned with treatment of the oil-bearing zone in the vicinity of a well penetrating the reservoir so that the resulting oil flows more readily.

While the idea of introducing an oil soluble fluid to reduce the viscosity of petroleum thereby rendering it more easily produced is not new, all the methods of which I am aware employ a gas injection or "pressuring up" step in the producing well to reduce the viscosity of the oil, discontinuing the latter step, and thereafter recovering the oil by resorting to any one of several "assisted recovery" methods, such as waterflooding, combustion, gas drive, etc. Any such procedure, however, has the disadvantage that the producing well must be shut in while the viscosity of the petroleum is being reduced by injection of an appropriate fluid into the oil zone via the producing well.

It is accordingly an object of my invention to provide a method for recovering petroleum, particularly heavy oil, in which an oil soluble fluid is injected into the oil via a producing well to lower its viscosity while at the same time supplying a force from an offset well sufficient to move the oil of reduced viscosity through the reservoir to a zone of reduced pressure in the producing well and recovering oil therefrom. It is another object of my invention to inject and withdraw fluids at two different levels in a well by first fracturing between said levels and thereafter injecting an oil soluble fluid at one level in said well and withdrawing a different fluid from the other level. It is a further object of my invention to inject and withdraw fluids at two different levels in a well by first fracturing between said levels, placing in the resulting fracture a material impermeable to oil soluble fluids and thereafter injecting an oil soluble fluid at one level in said well and withdrawing a different fluid from the other level.

One embodiment of my invention contemplates first at least one injection well and one producing well extending into the oil-bearing zone. The producing well is then fractured at an intermediate level in the oil-bearing zone and the resulting fracture, which may extend from the well as much as 75 to 100 feet, is then filled with cement, resulting in a relatively thin pancake which, on setting, forms a fluid impermeable barrier. An oil soluble fluid is then introduced into the oil zone via the producing well under circumstances such that the fluid flows into the oil zone, for example, only below the aforesaid fluid barrier. This fluid travels to the far end of said barrier and mixes with or is dissolved in the oil causing the latter to become less viscous. Simultaneously a fluid is introduced into the oil-bearing zone from an offset well causing a flow of oil toward the producing well. Since the viscosity of the oil around the producing well has been substantially reduced by the aforesaid fluid injection step, movement of oil into the producing well is more readily effected. Thus, once the process is lined out, we have the simultaneous flow of fluids into the oil-bearing zone via the injection and producing wells together with the flow of oil into and the withdrawal thereof from the producing well. The oil flows over the top or side of the barrier opposite the flow of injected fluid and into a lower pressure zone in the producing well.

The method of my invention may be further illustrated by referring to the accompanying drawing in which an oil-bearing zone 2 situated between substantially gas impermeable overburden 4 and underburden 6 is penetrated by cased injection and producing wells 8 and 10, respectively. Producing well 10 is fractured at a level about two-thirds of the way down from overburden 4 after which cement is squeezed into the resulting fracture to form a pancake or layer 12 impermeable to oil soluble fluids. This pancake generally should extend from about 50 to 75 feet out from producing well 10 and toward well 8. In any event, layer 12 should extend far enough away from well 10 so that essentially no mixing of injected and produced fluids occurs within at least 15 to 20 feet from well 10, as will be explained below. If desired, other substances such as resins, for example an epoxy resin, may be substituted for the cement in layer 12.

Prior to initiating operations, wells 8 and 10 are perforated and tubing 14 is extended down well 8 to a level essentially opposite perforations 16 and above bridge plug 18. In well 10, tubing 20 is lowered to a level opposite perforations 22 which are sealed off from direct communication with perforations 24 by means of packer 26.

In operation an oil soluble fluid, for example a gas such as carbon dioxide, methane, ethane, propane, butane, natural gas, or a mixture of these materials, is injected into formation 2 via tubing 20 and perforations 22. This gas is added to the system through valved line 28 and is under a pressure sufficient to favor extensive solution of the gas in the oil. Oftentimes—if natural gas is used—it is already under sufficient pressure to effect adequate solution in the oil. However, if extra pressure is needed, the gas supply can be run through a compressor (not shown) before it flows into the system via line 28. Optimum injection pressures will vary with the formation. Initially the gas may be injected under relatively low pressure and the pressure gradually increased until sufficient solution into the oil is obtained, i.e., a pressure capable of holding the gas in solution. As the gas goes into solution, the oil both increases in volume and decreases in viscosity. This is true initially, particularly in that portion of oil zone 2 below layer 12. The gas flow—as well as the flow of diluted oil—is indicated by the arrows in the vicinity of layer 12. The flow of this oil of reduced viscosity is assisted by a fluid such as, for example, water, introduced into zone 2 via line 30, tubing 14 and perforations 16. Owing to the relatively high fluid pressure in the reservoir resulting from injection of fluid through tubing 20, which pressure may be typically 1,000 to 5,000 p.s.i., the flow of injected water from well 8 tends to be diverted from the lower portion of oil zone 2, around the upper side of layer 12 and onto well 10. If desired, the procedure for gas injection via well 10 may be altered by employing intermittent instead of continuous injection. In such case, gas is displaced into the formation for a given interval, e.g., 10 to 30 days after which it is discontinued until the viscosity of the produced oil approaches that of the original oil, production being continued at well 10. Thereafter the gas injection step is resumed, with injection of fluid in offset well 8 continuing in uninterrupted flow.

Thus, in this manner oil can be readily produced and recovered through line 32. The produced oil is taken to separator equipment (not shown) where the gas is recovered, compressed and returned to the reservoir via line 28 and tubing 20, all as previously described. This operation is continued until breakthrough of the driving fluid—in this case, water.

In place of using water as the driving fluid, a combination of combustion and water drive may be used. Thus, combustion may be initiated in well 8 and carried out in a known manner until the combustion front, for example, approaches the outer limits of layer 12. The burning process is then halted because the heat generated—if continued—would tend to liberate the gas or diluent fluid from the oil, resulting in a rethickening thereof. After combustion has been halted, water is injected as before and the operation continued until water breakthrough or until the procedure becomes uneconomic. In many cases it will be found preferable to carry out the combustion step first since the mobility ratio of water and reservoir oil is relatively high, frequently resulting in low sweep efficiency. On the other hand, combustion generally is considered to be a procedure highly suited to the recovery of many heavy oils and therefore the combination of combustion followed by waterflooding makes a very effective drive system since substantially maximum utilization of the heat is realized in the waterflooding step without an undesirable effect on the major portion of the diluted oil.

Instead of gas as the oil soluble fluid, liquids such as LPG or kerosene may be used as the material for diluting the heavy oil in the vicinity of the producing well. Therefore, it is to be understood that the expression "volatile oil soluble fluid" as used in the accompanying claims is intended to mean and include any such fluid boiling no higher than kerosene. It may be desirable in some instances to reverse the levels in the producing well at which the diluent (gas or liquid) is introduced into the formation and the thinned oil recovered.

While I have described particular embodiments of my invention, it will be readily appreciated that it has numerous variations, all of which are contemplated herein. For example, instead of placing cement or other material impermeable to the oil soluble fluid employed, I may fracture the oil-bearing zone as previously described, omit the squeezing of the cement or equivalent material into the resulting fracture and inject fluid into the fracture, relying on diffusion thereof into the rock matrix to effect a reduction in oil viscosity. In such case, of course, the packer would be set either above or below the fracture. If the gas (fluid) is injected into the formation via the well annulus, then the packer would have to be set below the fracture—preferably just beneath it and oil recovered through the tubing, terminating below the packer. If fluid injection is made through the tubing and into the fracture, the packer is set above the fracture and oil produced through the annulus. In place of introducing water into the formation via the injection well, I may employ as the drive fluid a mixture of water and a gas such as natural gas—or the water and gas may be injected as alternate slugs.

I claim:

1. In a process for recovering petroleum from an underground deposit thereof penetrated by an injection well and a producing well, the improvement which comprises placing a horizontal fracture in said deposit adjacent said producing well, thereafter injecting a volatile oil soluble fluid boiling no higher than kerosene into said deposit via a conduit opening into a confined space including said fracture, said fluid being injected at sufficient pressure to cause solution of said fluid in said petroleum and maintaining said pressure substantially throughout said process, simultaneous with the introduction of said volatile liquid into said producing well injecting a fluid into said deposit via said injection well at sufficient pressure to cause said petroleum to flow toward said producing well, and recovering said petroleum from said producing well through a confined path in communication with said deposit only above said fracture, said path having a pressure therein substantially less than that in said deposit.

2. The process of claim 1 in which said deposit is situated between substantially fluid impermeable overburden and underburden.

3. The process of claim 1 in which the volatile oil soluble fluid employed is natural gas.

4. The process of claim 1 in which the volatile oil soluble fluid employed is LPG.

5. The process of claim 1 in which the fluid introduced through the injection well is water.

6. The process of claim 5 in which a combustion front is initiated in said deposit adjacent said injection well and propagated out into said deposit but a substantial distance from said fracture prior to the water injection step.

7. In a process for recovering petroleum from an underground deposit thereof penetrated by an injection well and a producing well, the improvement which comprises initiating a combustion front in said injection well, placing a horizontal fracture in said deposit adjacent said producing well, thereafter injecting a volatile oil soluble fluid boiling no higher than kerosene into said deposit via a first conduit opening into a confined space in said producing well and including said fracture, said fluid being injected at sufficient pressure to cause solution of said fluid in said petroleum and maintaining said pressure substantially throughout said process, propagating said combustion front to a point in said deposit away from said injection well but a substantial distance from said fracture, thereafter injecting water into said deposit via said injection well at sufficient pressure to cause said petroleum to flow toward said producing well and recovering said petroleum from said producing well through a confined path in communication with said deposit at a level other than the level of said fracture, said path having a pressure therein substantially less than that in said deposit.

8. In a process for recovering petroleum from an underground deposit thereof penetrated by an injection well and a producing well, the improvement which comprises placing a horizontal fracture in said deposit adjacent said producing well, filling said fracture with a material impermeable to oil soluble fluids, thereafter injecting into a confined space below to resulting filled fracture and into said deposit a volatile oil soluble fluid boiling no higher than kerosene via a conduit opening into a confined space below said fracture, said fluid being injected into said deposit at sufficient pressure to cause solution of said fluid in said petroleum and maintaining said pressure substantially throughout said process, simultaneous with the introduction of said volatile fluid into said producing well injecting a fluid into said deposit via said injection well as sufficient pressure to cause said petroleum to flow toward said producing well, and recovering said petroleum from said producing well through a confined path in said producing well in communication with said deposit only above said filled fracture, said path having a pressure therein less than that in said deposit.

9. In a process for recovering petroleum from an underground deposit thereof penetrated by an injection well and a producing well, the improvement which comprises placing a horizontal fracture in said deposit adjacent said producing well, filling said fracture with a material impermeable to oil soluble fluids, thereafter injecting into a confined space above the resulting filled fracture and into said deposit a volatile oil soluble fluid boiling no higher than kerosene into said deposit via a first path opening into a confined space in said producing well, said fluid being injected at sufficient pressure to cause solution of said fluid in said petroleum and maintaining said pressure substantially throughout said process, simultaneous with the introduction of said volatile fluid into said producing well injecting a fluid into said deposit via said injection well at sufficient pressure to cause said petroleum to flow toward said producing well, and recovering said petroleum from said producing well through a second confined path in communication with said deposit and below said filled fracture, said path having a pressure therein less than that in said deposit.

10. In the process of claim 9 in which said fracture extends for a major portion of the distance between said wells.

11. The process of claim 9 in which the material employed to fill the fracture is cement.

12. In a process for recovering petroleum from an underground deposit thereof penetrated by an injection well and a producing well, the improvement which comprises placing a horizontal fracture in said deposit and extending for a major portion of the distance between said wells, thereafter injecting a volatile oil soluble fluid boiling no higher than kerosene into said deposit via a conduit opening into a confined space including said fracture, said fluid being injected at sufficient pressure to cause solution of said fluid in said petroleum and maintaining said pressure substantially throughout said process, simultaneous with the introduction of said volatile liquid into said producing well injecting a fluid into said deposit via said injection well at sufficient pressure to cause said petroleum to flow toward said producing well, and recovering said petroleum from said producing well through a confined path in communication with said deposit only above said fracture, said path having a pressure therein substantially less than that in said deposit.

References Cited
UNITED STATES PATENTS

| | | | |
|---|---|---|---|
| 2,880,803 | 4/1959 | Parker | 166—11 |
| 3,026,935 | 3/1962 | Allen et al. | 166—11 |
| 3,036,632 | 5/1962 | Koch et al. | 166—11 |
| 3,055,423 | 9/1962 | Parker | 166—11 |
| 3,064,728 | 11/1962 | Gould | 166—2 |
| 3,221,811 | 12/1965 | Prats | 166—11 |
| 3,252,512 | 5/1966 | Baker et al. | 166—2 |

STEPHEN J. NOVOSAD, *Primary Examiner.*